United States Patent
von Knorre

(10) Patent No.: US 7,215,058 B2
(45) Date of Patent: May 8, 2007

(54) ROTOR MOTOR AND PROCESS FOR PRODUCING A ROTOR

(75) Inventor: Dietrich von Knorre, Hatten (DE)

(73) Assignee: Schunk Motorensysteme GmbH, Ganderkesee (DE)

( * ) Notice: Subject to any disclaimer, the term of this patent is extended or adjusted under 35 U.S.C. 154(b) by 22 days.

(21) Appl. No.: 11/062,760

(22) Filed: Feb. 23, 2005

(65) Prior Publication Data

US 2005/0231063 A1    Oct. 20, 2005

(30) Foreign Application Priority Data

Feb. 23, 2004    (DE) ...................... 10 2004 009 047

(51) Int. Cl.
*H02K 1/22*    (2006.01)
(52) U.S. Cl. .......................................... 310/268; 310/71
(58) Field of Classification Search .................. 310/71, 310/261, 233–237, 268
See application file for complete search history.

(56) References Cited

U.S. PATENT DOCUMENTS

RE25,305 E * 12/1962 Haydon ....................... 310/268
RE33,628 E * 7/1991 Hahn ........................... 310/268
6,684,485 B1 * 2/2004 Potocnik et al. ............. 29/597

FOREIGN PATENT DOCUMENTS

EP    1249917    10/2002
WO    9210352    6/1992

* cited by examiner

*Primary Examiner*—Thanh Lam
(74) *Attorney, Agent, or Firm*—Dennison, Schultz & MacDonald

(57) ABSTRACT

A rotor motor (10) includes a rotor (12), a rotor winding (22, 44), carbon brushes (24, 26), at least one magnet (16), and a shaft (14) originating from the rotor. In order to simplify the design and make economical production possible, the rotor winding is injection molded onto the rotor using an electrically conducting plastic.

9 Claims, 4 Drawing Sheets

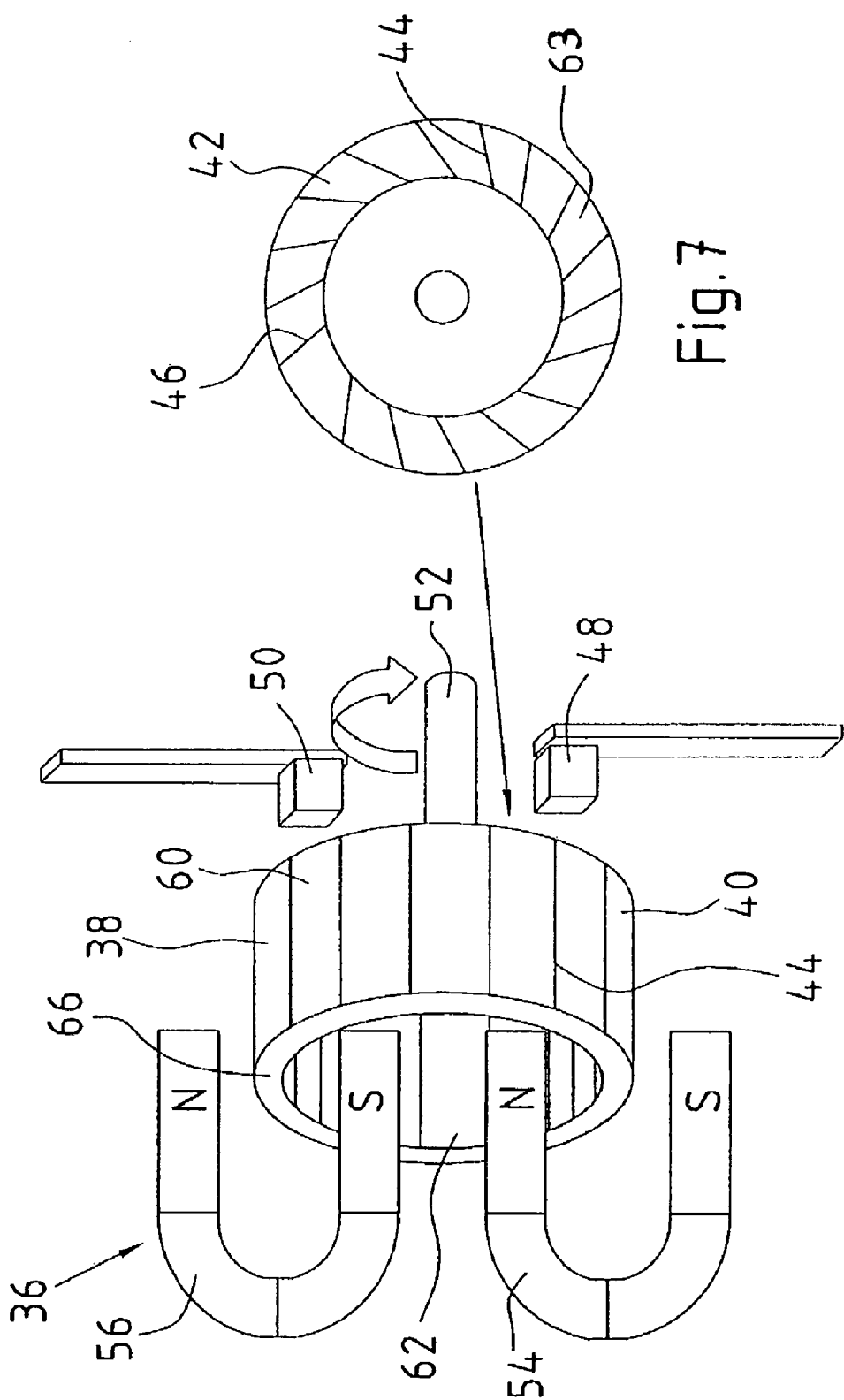

ROTOR MOTOR AND PROCESS FOR PRODUCING A ROTOR

The invention concerns a rotor motor in the form of a disk rotor motor, or a cage motor with a disk-shaped or pot-shaped rotor, a rotor winding that runs on the electrically insulating material of the rotor, carbon brushes, as well as at least one magnet, wherein the rotor winding extends along the front and rear side of the rotor in the disk-shaped rotor, and along the inner and outer side of the rotor in the pot-shaped rotor. The invention concerns also a process for producing a rotor of a disk rotor motor, or a cage motor having a rotor winding that runs on the electrically insulating material of the rotor.

Rotor motors are used frequently in servo drive technology. Their application in the automobile sector is growing strongly because of their compact design. However, the winding of the rotor is a disadvantage of the corresponding rotor motors.

A disk rotor motor of the type mentioned above is known from "www.servotechnik.de/Fachbeiträge/Motoren." The rotor consists therein of a support, which is provided with an insulating layer. The rotor winding is mounted on the insulating layer in the form of conductor tracks. In the simplest case, the forward and return conductor is located on the front and rear side of the insulating layer. The magnetic field is generated by permanent magnets that are affixed to the layer shields. The magnetic reflux occurs through the housing. A commutator is not required, because the brushes make direct contact with the conductor tracks. The rotor winding can have an iron-free design, so that a very small moment of inertia results.

In a cage or bell-shaped rotor motor found in the same publication, the rotor winding is mounted on a carrier disk. The rotor winding encloses a permanent magnet, wherein the magnetic reflux can also occur in an iron-free design through the housing. The rotor winding can likewise have an iron-free design.

EP-A-1 249 917 presents an electric motor having a rotor with a stator surrounding the same, wherein the rotor consists of a base body of magnetically conducting material. On the base body electrically conducting areas are realized, which are made of electrically conducting plastic and form the rotor winding. The electrically conducting plastic is formed by extrusion, or in powder metal technology.

A disk rotor motor having a disk-shaped rotor, which has a rotor winding on the front and rear side, is known from DE-A-199 43 692.

The production of electrically conducting plastic by injection molding is described in WO-A-92/10352.

It is an object of the present invention to further develop a rotor motor of the above mentioned type in such a way that the result is a simplified design. The production of the rotor of the motor should also be economical.

In order to attain the object, the invention provides a rotor motor in the form of a disk rotor motor or a cage motor having a rotor, a rotor winding that runs on the electrically insulating material of the rotor, carbon brushes, as well as at least one magnet, wherein the rotor winding extends along the front and rear side of the rotor in the disk-shaped rotor, and along the inner and outer side of the rotor in the pot-shaped rotor, and is characterized in that the rotor has through holes that are passed through by the conducting plastic of which the rotor winding is made.

The rotor therein is especially provided with a sandwich structure that is such that the windings of the rotor winding run between layers consisting of electrically insulating material. This way, it is possible to increase the amount of windings of the rotor winding, with the consequence that the rotational speed of the rotor can be reduced to desired values of less than 10,000 rpm, preferably 6,000 rpm.

The invention is further characterized by a process for producing a rotor of a disk or bell-shaped rotor motor having a rotor winding that runs on the electrically insulating material of the rotor, wherein the rotor winding made of electrically conducting material is injection molded on the rotor. Thereby, the rotor can be an injection molded part made of plastic onto which the rotor winding is injection molded pursuant to the invention.

It is especially possible to produce the rotor and the rotor winding by means of a dual-component injection molding process, which results in an economical simplification. As a consequence, a high piece number of rotor motors can be produced and made available at a low cost.

Further details, advantages, and features of the invention result not only from the claims and the features disclosed therein, per se or in combination, but also from the following description of the embodiments shown in the drawings, wherein:

FIG. 6 shows a schematic diagram of a bell-shaped rotor motor;

FIG. 7 shows a rotor of FIG. 6 in rear view;

Figure 1:
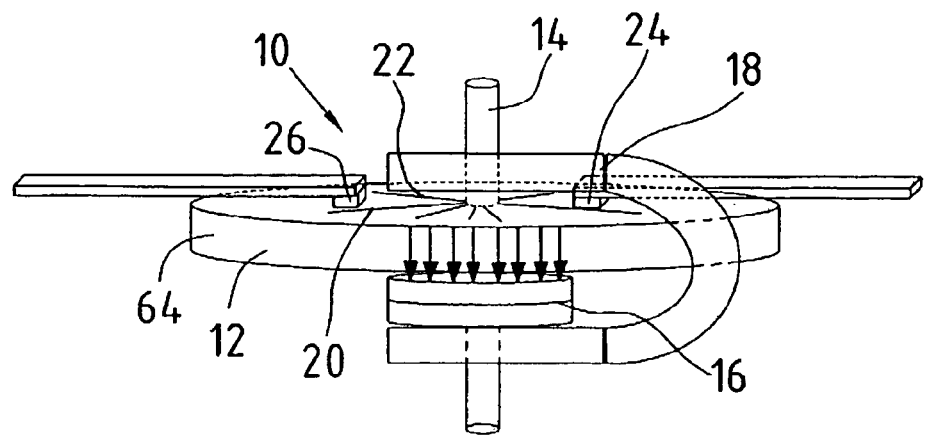
FIG. 1 shows a schematic diagram of a disk rotor motor.
Figure 2:
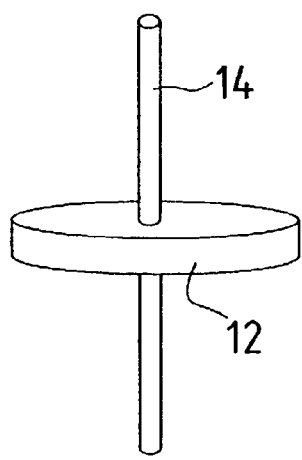
FIG. 2 shows a perspective view of a rotor of the disk rotor motor of FIG. 1.

FIG. 1 shows a schematic diagram of a disk rotor motor 10 having a rotor 12 in the shape of a disk, from which a shaft 14 originates, over which the disk 12 is carried. A permanent magnet 16, which generates a purely in principle drawn in magnetic field 18 that passes through windings 20 of a rotor winding 22, is assigned to the rotor 12. Electric current is fed to the rotor winding 22 via carbon brushes 24, 26 in order to operate the disk rotor motor 10. Reference is made to known motors with regard to the basic construction design.

Pursuant to the invention, the disk-shaped rotor 12 and the rotor winding 22 are injection molded elements, that is, the rotor 12 is a plastic part made of electrically insulating material onto which a plastic consisting of electrically conducting material is injection molded, which forms the rotor winding 22 or its windings 20.

There are different possibilities, of which one is shown purely in principle in FIGS. 2 through 5, for applying the rotor winding 22 on the rotor 12 so that the individual sections consisting of electrically conducting plastic are electrically connected to each other. Thus, FIG. 2 again depicts the rotor 12 in the form of a disk-shaped element made of an electrically insulating plastic, and also the shaft 14 that originates therefrom. Through holes 30, 32 are formed in the disk-shaped element during the injection molding process. These are then passed through during the injection molding by windings 20 made of electrically conducting plastic, that is, the rotor winding 22, as can be seen purely in principle in FIGS. 4 and 5. This way a closed current path is formed, to which electric current is fed via the carbon brushes 24, 26 in order to set into rotation the rotor 12. A direct commutation occurs thereby, that is, the carbon brushes 24, 26 rest directly on the disk-shaped element, that is, the rotor winding 22 or its windings 20.

In order to achieve a high winding density, it is possible to realize the rotor 12 with a sandwich-like design, that is, by injection molding the windings of electrically conducting plastic between the layers of electrically insulating plastic. It is possible this way to operate the rotor 12 with a desired rotational speed.

FIG. 6 illustrates purely in principle a bell-shaped rotor motor 34, which consists of a pot-shaped rotor 38 having a hollow cylindrical peripheral section 40, and a bottom section 42. The base body of the rotor 38, that is, the peripheral section 40, and the bottom section 42, is an injection molded plastic part onto which a plastic of electrically conducting material is injection molded in accordance to the concept of FIGS. 1 through 5 in order to realize a rotor winding 44, which extends along the inner and outer surface of the peripheral section 40, and the bottom section 42, as can be seen in FIG. 7. Carbon brushes 48, 50 rest directly on the windings 46 of the rotor winding 44 running along the outer surface of the bottom section 42, so that a separate commutator is not required. A shaft 52 also goes out of the rotor 38. In FIG. 6, the carbon brushes are shown at a distance from the bottom section 42.

FIG. 6 also shows permanent magnets 54, 56, whose magnetic fields pass through the rotor winding 44 in the usual way.

Figure 8:
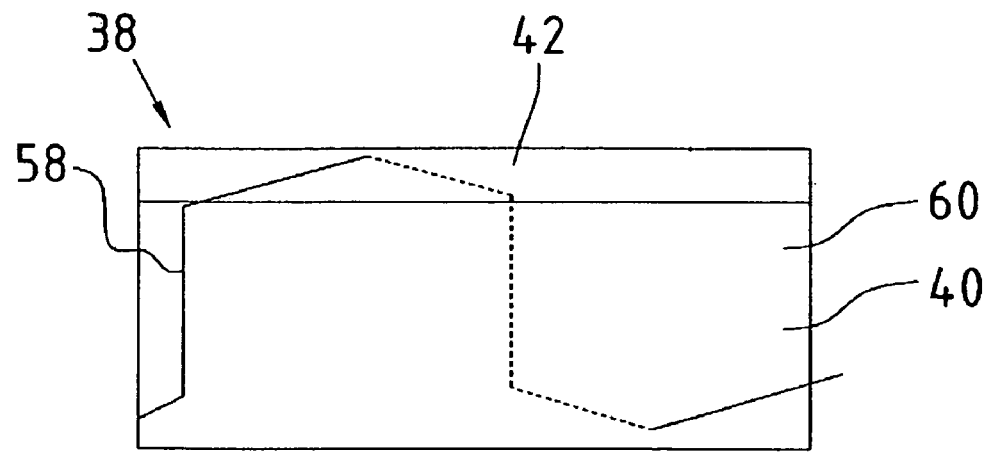
FIG. 8 shows a schematic diagram of a winding of the rotor of FIG. 7.

FIG. 8 shows purely in principle the developed view of the rotor 38 with a section 58 of the rotor winding 44, which extends along the outer side 60 of the hollow cylinder section 40 of the rotor 38, as well as along the inner side 62. The latter is indicated by means of the winding 58 shown in dashed outline.

Through holes (which are not shown) that are passed through by the electrically conducting plastic material are provided in the outer free edge region of the hollow cylinder section 40 in order for the injection molded electrically conducting plastic material used for the realization of the rotor winding 44 to run along the outer side 60, as well as also the inner side 62. In the region of the bottom section 42, the electrically conducting plastic material extends along the outer surface 63 on which the carbon brushes 48, 50 rest, as well as along the inner surface (dashed outline in FIG. 8).

Figure 9:
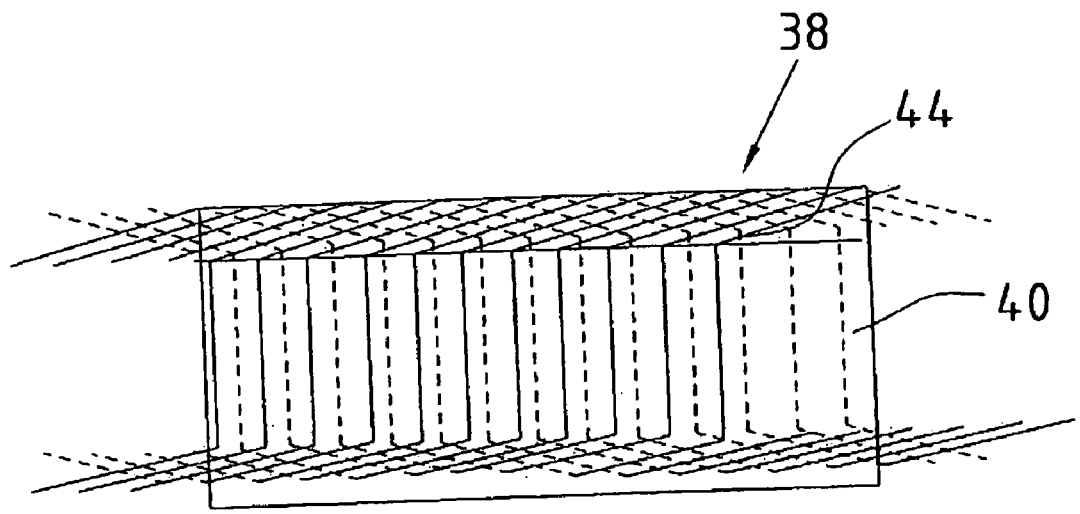
FIG. 9 shows a further schematic diagram of the rotor of FIG. 7 with rotor winding; and, FIG. 10 shows the rotor winding arranged in several layers on the rotor.
Figure 10:
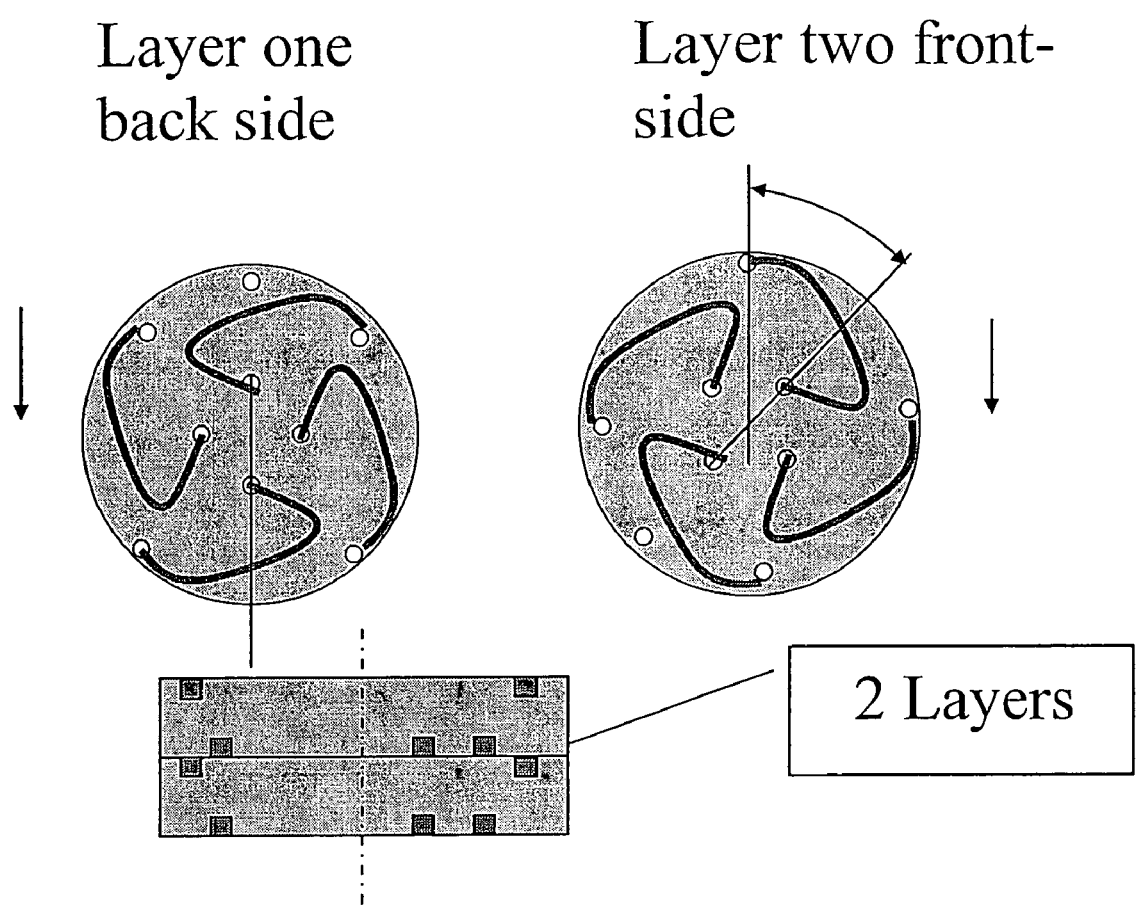

A developed view of the rotor 38, but with an already injection molded rotor winding 44, can be seen in FIG. 9. Therein, it can be seen that the sections of the electrically conducting plastic material that form the windings run at a considerable distance from each other in order to prevent short circuits. The winding density is limited thereby. It is possible to provide the rotor 38 with a sandwich-like design, that is, to arrange the rotor windings one above the other separated by layers of electrically insulating plastic in order to increase the winding density.

Figure 3:
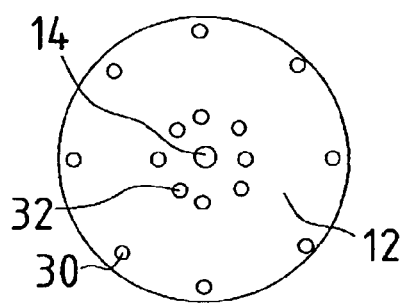
FIG. 3 shows a top view on the rotor of FIG. 2.
Figure 4:
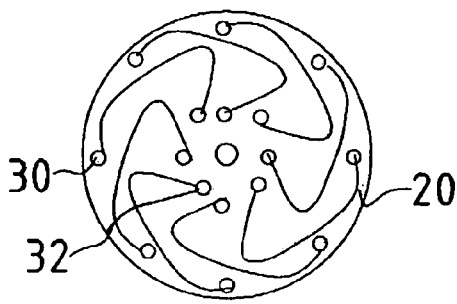
FIG. 4 shows a frontal view of the rotor of FIGS. 2 and 3 with rotor winding.
Figure 5:
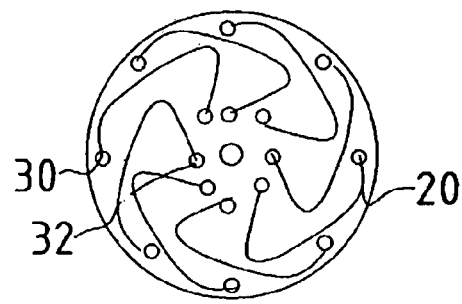
FIG. 5 shows a rear view of the rotor of FIG. 4 with rotor winding.

Without abandoning the scope of the invention, it is also possible for the sections of the rotor winding 22, or 44 to run along the peripheral edge 64 of the disk-shaped rotor 12, or the front edge 66 of the pot-shaped, or bell-shaped rotor 38, so that the peripheral through holes 30 are unnecessary in the embodiment shown in FIGS. 3 through 5. The same would apply in this case for the through holes that are not shown in FIG. 8.

The invention claimed is:

1. A disk rotor motor (10) comprising
    a disk-shaped rotor (12, 38);
    a rotor winding (22, 44) that runs on electrically insulating material of the rotor;
    carbon brushes electrically connected with said rotor winding and at least one magnet;
    wherein said carbon brushes lie on the rotor winding;
    wherein said rotor winding penetrates openings in the disk-shaped rotor and extends along a top side and a bottom side of the rotor; and
    wherein the portions of the rotor winding that penetrate openings in the rotor and extend along the top side and bottom side of the rotor are integral and made from an electrically conductive plastic material that is injection molded onto the disk-shaped rotor.

2. The rotor motor of claim 1, wherein the disk-shaped rotor has a peripheral edge along which the rotor winding runs.

3. The rotor motor of claim 1, wherein the disk-shaped rotor (12) is a ring plate.

4. The rotor motor of claim 3, wherein the ring plate has an inner edge along which the rotor winding runs.

5. The rotor motor of claim 1, wherein the rotor winding (22, 44) is arranged in several layers on the rotor (12, 38), whereby an electrically insulating material from electrically conducting plastic is present between the windings of the rotor winding.

6. The rotor motor of claim 5, wherein the rotor (12, 38) has a sandwich-like structure.

7. The rotor motor of claim 1, wherein a shaft (14, 16) realized as one piece with the rotor originates from the rotor (12, 38).

8. The rotor motor of claim 1, wherein the disk-shaped rotor is formed from electrically insulating plastic in an injection molding process.

9. The rotor motor of claim 1, wherein the disk-shaped rotor and winding are formed in at least a dual injection molding process.

* * * * *